April 4, 1967     U. A. GARCIA     3,312,917
ELECTRICAL CONTROL SWITCH FOR AUTOMOBILE AIR CONDITIONERS
Filed Dec. 1, 1965
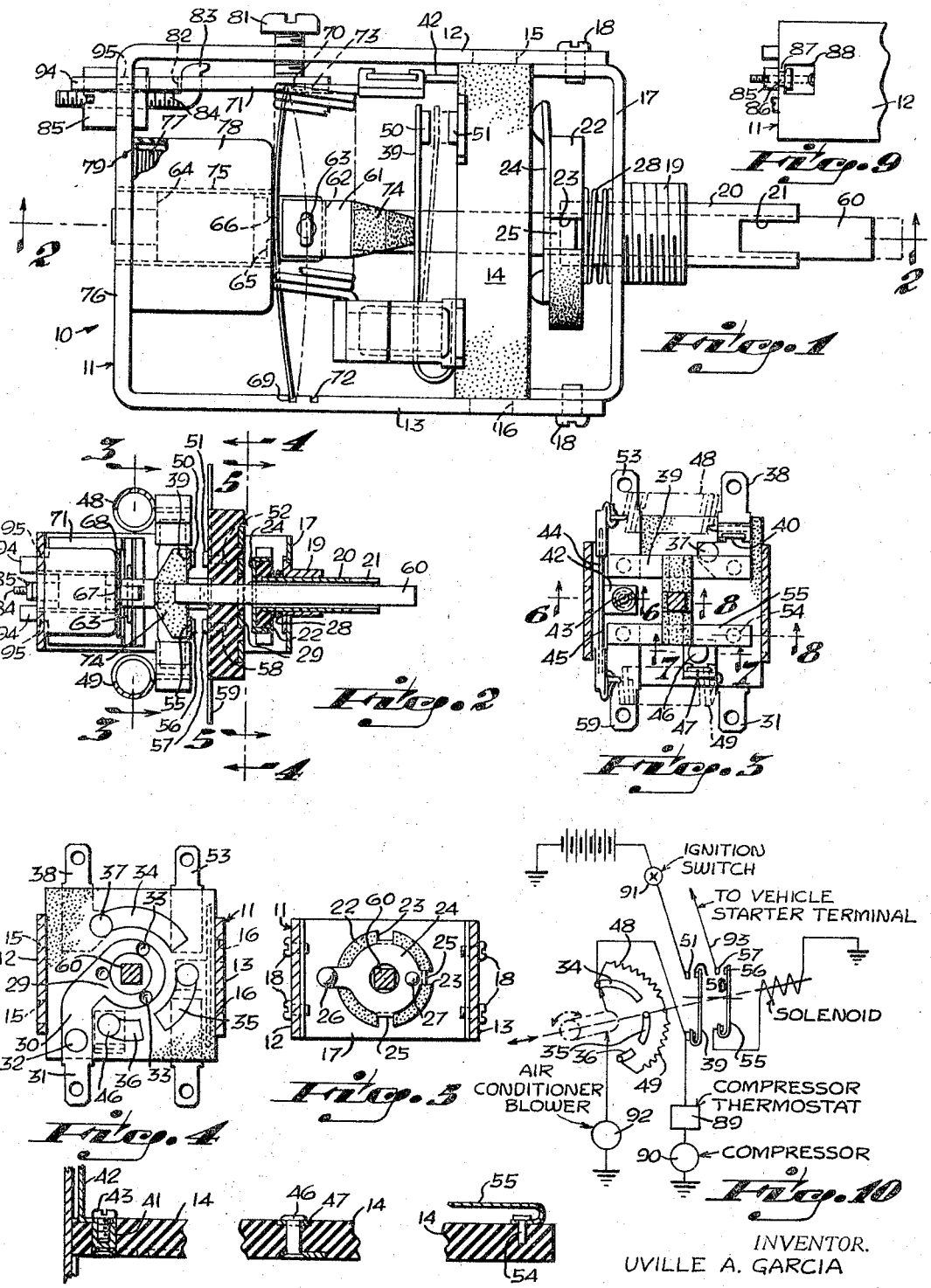
INVENTOR.
UVILLE A. GARCIA

United States Patent Office 3,312,917
Patented Apr. 4, 1967

3,312,917
ELECTRICAL CONTROL SWITCH FOR AUTOMOBILE AIR CONDITIONERS
Uville Alexander Garcia, 3125 NW. 86th St., Miami, Fla. 33147
Filed Dec. 1, 1965, Ser. No. 510,762
7 Claims. (Cl. 335—122)

My invention relates to automotive vehicle air conditioning and is directed particularly to an improved form of electrical control switches for automobile air conditioners.

At the present time electrically powered automobile air conditioners are connected to the vehicle ignition switch through an on-off switch controlling energization of the compressor and blower of the air conditioner. Such switches usually include means for switching in various resistors in series with the blower circuit for stepwisely varying blower speed in accordance with the amount of cooling desired in the vehicle. A serious disadvantage of such electrical air conditioner switches is that if they are accidently left in "on" position when the vehicle ignition switch is turned off upon stopping the vehicle motor, the air conditioner will be turned on again simultaneously with the motor ignition the next time the vehicle is started. Such action results in the air conditioner compressor clutch being engaged and therefore mechanically coupled with the vehicle engine at the time the engine is being started. Since during the starting it is not uncommon for the engine to accelerate to high speeds capable developing high horsepower, unusual stresses are imparted to the compressor mechanism during such starting, often resulting in slippage at the clutch. This is particularly true if the compressor has been at rest for a substantial period of time during which oil has gravitated to the oil sump in the compressor. If the air conditioner energization switch is left "on" often during starting of the vehicle engine, the useful life of the air conditioning mechanism will be appreciably shortened.

It is accordingly the principal object of my invention to obviate the above described deficiencies of presently used air conditioner starting devices by the provision of an improved form of electrical switch that automatically open-circuits or returns to "off" position immediately before the vehicle is next started if left in "on" position when the vehicle engine was last stopped.

A more particular object is to provide an automotive vehicle electrical control switch of the character above described including compressor and blower switches which, besides being manually controlled, include solenoid means energized by the energization circuit to the vehicle electric starter motor for automatically moving the compressor and blower switches to open-circuit or "off" position if left on prior to starting of the vehicle engine.

Another object of my invention is to provide an electrical control switch of the character above described including means for stepwisely adjusting blower speed when the blower and compressor switches are in "on" position and the ignition switch is in "on" position, whether or not the vehicle engine is running.

Still another object is to provide an electrical control switch of the above nature which will be simple and compact in structure, easy to use and install, dependable in operation and durable in use.

Other objects, features and advantages of the invention will be apparent from the following description when read with reference to the accompanying drawings. In the drawings, wherein like reference numerals denote corresponding parts throughout the several views:

FIG. 1 is a side elevational view, on an enlarged scale, of a control switch embodying the invention;

FIG. 2 is a longitudinal cross-sectional view of the switch shown in FIG. 1 reduced in scale, taken along the line 2—2 thereof in the direction of the arrows;

FIG. 3 is a transverse cross-sectional view taken along the line 3—3 of FIG. 2 in the direction of the arrows;

FIG. 4 is a transverse cross-sectional view taken along the line 4—4 of FIG. 2 in the direction of the arrows;

FIG. 5 is a transverse cross-sectional view taken along the line 5—5 of FIG. 2 in the direction of the arrows;

FIG. 6 is a transverse cross-sectional view taken along the line 6—6 of FIG. 3 in the direction of the arrows;

FIG. 7 is a transverse cross-sectional view taken along the line 7—7 of FIG. 3 in the direction of the arrows;

FIG. 8 is a transverse cross-sectional view taken along the line 8—8 of FIG. 3 in the direction of the arrows;

FIG. 9 is a fragmentary view illustrating details of the toggle spring adjustment mechanism; and FIG. 10 is a schematic representation of the control switch illustrating its electrical circuitry and its connection in use in an automotive air conditioner energization circuit.

Referring now in detail to the drawings, 10 designates an electrical control switch for automobile air conditioners, the same comprising a U-shaped support frame member 11, preferably of bent sheet metal, having spaced parallel side walls 12, 13 secured between which, near the outer ends thereof, is a substantially square support block 14 of electrically-insulating material such as one of the non-electrically conductive synthetic plastics. The support block 14 is removably held in place by means of spaced pairs of protrusions 15, 15 and 16, 16 extending from opposite edges of said support block and received in openings of like shape, preferably square, in the side walls 12, 13 of the support frame member 11. The switch mechanism is held in assembled relation with respect to the support frame member 11 by means of a U-shaped, shallow, cap member 17, preferably of bent sheet metal, secured between the outer ends of the side walls 12, 13 of said support frame as by machine screws 18. Centrally affixed with respect to a central opening in the cap member 17 is an outwardly-extending, externally-threaded tubular stud 19 which, by use of a nut therewith (not illustrated), serves to mount the control switch in a control panel or dashboard of a vehicle.

Rotatably secured within the tubular stud 19 is a tubular shaft 20 slotted at the outer end as at 21 to receive thereon in locked relation a control knob (not illustrated), and having fixed thereto at the opposite or inner end a centrally apertured, electrically non-conductive disc 22. The disc 22 is notched in its periphery at three positions ninety circular degrees spaced from one another as indicated at 23 (see FIG. 5). Removably fitted against the outer surface of the disc 22 is an electrically conductive, centrally-apertured rotor 24 of phosphor-bronze or the like formed with lugs 25 which fit into the notches 23 of said disc, and a radially-extending contact finger 26. The rotor 24 is formed with a rounded protrusion 27 opposite the contact finger 26 for detent action upon step-wise rotary positioning of said rotor, as is hereafter described. As best illustrated in FIG. 1, the disc 22, together with its tubular shaft 20, is resiliently constrained in the direction of the support block 14 by means of a helical compression spring 28 circumjacent said shaft and acting between said disc and the inside of the cap member 17.

As best illustrated in FIGS. 2 and 4, the outside or front side of the support block 14 has centrally secured thereto, in a suitable recess, a metal contact ring 29 having a sidewardly and outwardly-extending arm portion 30 terminating in an electrical terminal lug 31, said contact ring being held securely in place, substantially flush with the outer face of said support block, as by a rivet 32. The contact ring 29 is formed with three equidistantly-spaced indentations 33 which, together with the rounded protrusions 27 of the rotor 26, serve as a detent mechanism for holding the rotor at three rotatively angularly-spaced positions of switch adjustment, as is hereinbelow described. The front side of the support block 14 has also fitted therein three mutually-spaced, arcuate, segmented contact members 34, 35, 36 secured in concentrically spaced relation with respect to the contact ring 29 and electrically insulated therefrom and from each other.

The arcuate contact member 34 is secured in place by a metallic rivet 37 extending through the support block 14. As best illustrated in FIGS. 3 and 4, the end of the rivet 37 secures and electrically connects with the arcuate contact member 34 a terminal lug 38, a movable spring contact arm 39 and a resistor connector terminal 40.

The arcuate contact member 35, as is best illustrated in FIGS. 3, 4 and 6, is secured in place by an internally threaded metallic stud 41 extending through the support block 14 and making electrical contact with a T-shaped electrical conductor bracket 42 secured in place by a machine screw 43 (see FIG. 6). The conductor bracket 42 is formed with opposed, sidewardly-extending arms 44, 45 (see FIG. 3) terminating in connector lugs for removably connecting thereto blower circuit resistors, as is hereinbelow more fully described.

The arcuate contact member 36, as is best illustrated in FIGS. 3, 4, and 7, is secured in place by a metallic rivet 46 extending through the support block 14 and making electrical contact with a resistor connector terminal lug 47 secured thereat against the underside of said support block.

As is best illustrated in FIG. 3, a first helically-wound electrical resistor 48 fitted with terminal contact sockets or the like is connected between connector lug arm 44 of the conductor bracket 42 and resistor connector terminal 40, and a second helically-wound electrical resistor 49 is connected between conductor lug arm 45 of the conductor bracket 42 and resistor connector terminal lug 47.

As best illusrtated in FIGS. 1, 3 and 4 the outer end of the spring contact arm 39 is fitted at its outer extremity with a contact point 50 normally disposed in spaced relation with respect to a fixed contact point 51 secured against the support block 14 as by a rivet 52, which rivet also secures an electrical connector lug 53 to said support block for making electrical connection with said fixed contact point. Secured in spaced parallel relation to the spring contact arm 39 against the support block 14 as by rivet 54 (see FIGS. 3 and 8) is a second spring contact arm 55 the outer end of which is fitted with a contact point 56 normally in spaced relation with respect to a fixed contact point 57 secured against the support block 14 as by a rivet 58, which rivet also secures an electrical connecter lug 59 to said support block for making electrical connection with said fixed contact point.

Means is provided for simultaneously actuating the movable spring switch arms 39, and 55 both manually and automatically upon energization of the starter of the vehicle motor with which an air conditioning system is associated. To this end, a control shaft 60 of square cross-section extends through the tubular shaft 20 and a square central opening the support block 14, the inner end of said control shaft extending behind the spring contact arms 39 and 55 and terminating in a cylindrical head portion 61 the outer end of which is provided with a diametrical slot 62. Linked to the shaft head portion 61 as by a cotter pin 63 is a cylindrical ferromagnetic plunger 64, said plunger having a diametrical flattened head portion 65 received in the shaft head slot 62 for interlinking by said cotter pin. The flattened head portion 65 of the plunger 64 is formed with a neck portion 66 of reduced width which receives in interfitting relationship a central slot 67 in a flat, rectangular toggle spring 68 the ends of which are secured in opposed, transverse slots 69, 70 formed in the inner surfaces of the side wall 13 of the U-shaped support frame member 11 and the inner wall of an adjustment plate 71. A second pair of opposed transverse slots 72, 73, slightly spaced from the slots 69, 70 is preferably provided for adjusting the toggle spring 68 to optimum operational position in assembly.

As is best illustrated in FIGS. 1 and 4, the inner end of the control shaft 60 has secured thereat, as by molding thereon, an electrically non-conducting cross bar or yoke 74 of generally trapezoidal cross-sectional shape the outer or forward edge of which just rests against outer surface portions of the spring contact arms 39 and 55 when said spring contact arms are in open-circuit position with respect to their contact points. In this position, the flat toggle spring 68 will be bowed to the rear of the control switch, as illustrated by the full line representation thereof in FIG. 1. The plunger 64 is slidingly received in a brass guide tube 75 centrally secured at one end in the web portion 76 of the U-shaped support frame member 11, being frictionally held in a circular opening in said frame web portion. A solenoid coil 77 (see FIG. 1) surrounds the guide tube, said solenoid coil being covered by an insulating cap 78. One terminal of the solenoid coil 77 is grounded to the support frame 11, as indicated at 79 in FIG. 1, and the other terminal is connected to the second spring contact arm 55, as is illustrated in the schematic diagram of FIG. 10.

The adjustment plate 71 is disposed in closely spaced relative disposition against the inside of the side wall 12 of the support frame member 11, near the inner end thereof, and is formed with spaced extension lugs 94, 94 received in slots 95, 95 provided in the web portion 76 of said frame member. Means is provided for controlling the spacing between the frame side wall 12 and the adjustment plate 71 for positional adjustment of the flat toggle spring 68. To this end, a machine screw 81 is threadingly received within the frame side wall 12 for adjustable abutment with the toggle spring 68. Means is also provided for adjusting the longitudinal position of the adjustment plate 71. To this end, the adjustment plate is provided with a central slot 28 hooked within which is the offset end portion 83 of a threaded stud 84 fitted with a thumb nut 85. The nut 85 is formed with a peripheral groove 86 received within which is the reduced or neck portion 87 of a recess 88 in the frame member 11 within which said nut is disposed for rotary motion. It will be apparent that the nut 85 is thus constrained against longitudinal motion, while permitting rotary adjustment motion to move the adjustment plate 71 back and forth for positional adjustment of the toggle spring 68.

Manual operation of the movable spring contact arms 39 and 55 is effected by pulling outwardly upon the outer end of the central shaft 60, a suitable knob (not illustrated) being affixed thereat for this purpose. Such movement will pull the toggle spring 68 from its first position of stability, as represented by the full line position thereof in FIG. 1, to its second position of stability, as represented by the broken line position thereof in FIG. 1, whereat the spring contact arms 39 and 55 will have been moved into closed-circuit positions with respect to their fixed contact points by the yoke 74.

Referring now to the schematic diagram of FIG. 10, it will be seen that when the switch 39, 51 is closed, the air conditioner compresser thermostat 89 and compresser 90 will be energized through ignition switch 91 of the vehicle, the contact point 51 of the spring contact arm being connected through control switch terminal 53 to said ignition switch, and said compresser thermostat being connected to terminal 38 of the control switch. At the same time, the electrical circuit for the air conditioner blower 92 will be energized through now closed switch 39, 51, permitting stepwise adjustment of blower speed through rotary adjustment of tubular shaft 20 as described above, whereby none, one, or both of the resistors 48 and 49 are placed in series with the blower energization circuit, depending upon the position of rotary adjustment selected. If the vehicle should now be stopped without pushing in the control shaft 60 to open-circuit the spring contact arm switches 39, 51, 55, and 57, the next time the vehicle is started energization of the starter motor will at the same instant energize the solenoid 77 through now closed switch 55, 56, fixed contact point 57 of said switch being connected as by conductor 93 to the vehicle starter energizing terminal, whereupon the solenoid plunger 64 will be drawn inwardly to snap the spring switch arms 55 and 39 into open-circuit position again, as illustrated by the full-line positions thereof in FIG. 1, where they will remain until the air conditioner is turned on again by pulling the control shaft 60 to its outmost position as described above. It well thus be apparent that the control switch automatically prevents starting of the air conditioner at the same time that the vehicle is started if the air conditioner switch is inadvertently left on before starting the vehicle.

While I have illustrated and described herein only one form in which the invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. In an electrical control switch for automobile air conditioners, the combination comprising, a supporting framework having spaced parallel front and back walls, an electrically-insulating support block secured transversely between said front and back walls within said framework, a solenoid coil secured to said framework and having a central cylindrical opening extending in front-to-back relation in said supporting framework, a ferromagnetic plunger slidably disposed in said solenoid opening and axially movable between inner and outer positions with respect thereto, a control shaft linked at one end to one end of said plunger for movement in unison therewith and having its other end extending through and beyond an opening in the front wall of said framework, yieldable toggle mechanism for holding said plunger, selectively, at one or the other of said inner and outer positions, said solenoid coil, when energized, being operative to move said plunger from said outer to said inner position, a pair of normally-open single-pole, single-throw switches mounted on one side of said support block at each side of the center thereof, a central opening in said support block through which said control shaft extends, and electrically non-conductive abutment means secured to said control shaft and straddling said pair of throw switches for moving them from open-circuit to closed-circuit positions when said control shaft is moved, together with said plunger, from said inner to said outer position upon manually pulling outwardly upon said other end of said control shaft.

2. In an electrical control switch for automobile air conditioners, the combination comprising, a supporting framework having spaced parallel front and back walls, an electrically-insulating support block secured transversely between said front and back walls within said framework, a solenoid coil secured to said framework and having a central cylindrical opening extending in front-to-back relation in said supporting framework, a ferromagnetic plunger slidably disposed in said solenoid opening and axially movable between inner and outer positions with respect thereto, a control shaft linked to one end of said plunger for movement in unison therewith and extending through an opening in the front wall of said framework, yieldable toggle mechanism for holding said plunger, selectively, at one or the other of said inner and outer positions, said solenoid coil, when energized, being operative to move said plunger from said outer to said inner position, a pair of normally-open single-pole, single-throw switches mounted on one side of said support block at each side of the center thereof, a central opening in said support block through which said control shaft extends, abutment means secured to said control shaft and straddling said pair of throw switches for moving them from open-circuit to closed-circuit positions when said control shaft is moved, together with said plunger, from said inner to said outer position, a plurality of electrical contacts arcuately disposed about the central opening of said support block on the other side thereof, a rotor having a radially-extending contact finger, means mounting said rotor against said other side of said support block for rotary motion with respect thereto with said contact finger in wiping contact with said electrical contacts, and a tubular shaft circumjacent said central shaft and connected at one end to said rotor mounting means and extending at the other end through said opening in the front of said framework and terminating short of the outer end of said control shaft.

3. An electrical control switch for automobile air conditioners as defined in claim 2 wherein said supporting framework comprises a pair of spaced, parallel side walls, and wherein said yieldable toggle mechanism comprises a flat spring centrally linked to said plunger and supported at each end between said framework side walls.

4. An electrical control switch for automobile air conditioners as defined in claim 3 including means for adjustably positioning the ends of said flat spring with respect to said side walls.

5. An electrical control switch as defined in claim 4 wherein said flat spring positioning means comprises an adjustment plate disposed in spaced relation against the inside of one of said side walls, a slot in said adjustment plate for receiving an edge of said flat spring, screw means for adjustably moving said adjustment plate laterally with respect to said one of said side walls, and means for adjustably moving said adjustment plate longitudinally with respect to said one of said side walls.

6. An electrical control switch as defined in claim 5 including electrical resistors interconnecting said plurality of electrical contacts.

7. An electrical control switch as defined in claim 2 wherein said single-pole single-throw switches each comprises a resilient movable contact arm.

References Cited by the Examiner

UNITED STATES PATENTS

| | | | |
|---|---|---|---|
| 2,416,358 | 2/1947 | Stilwell | 200—87 |
| 3,076,075 | 1/1963 | Colvill | 200—104 |

BERNARD A. GILHEANY, *Primary Examiner.*

J. BAKER, R. N. ENVALL, Jr., *Assistant Examiners.*